T. MORGAN.
FISH TRAP.
APPLICATION FILED APR. 21, 1908.
899,457.
Patented Sept. 22, 1908.
2 SHEETS—SHEET 2.
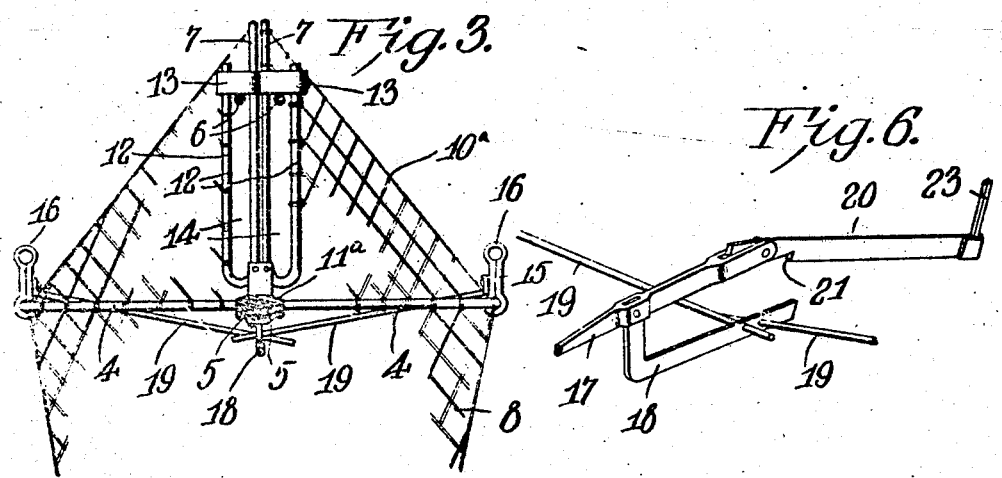
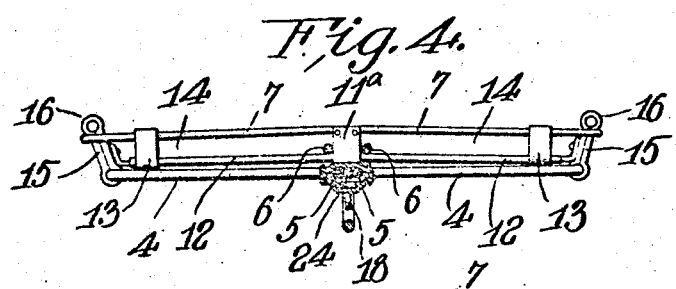
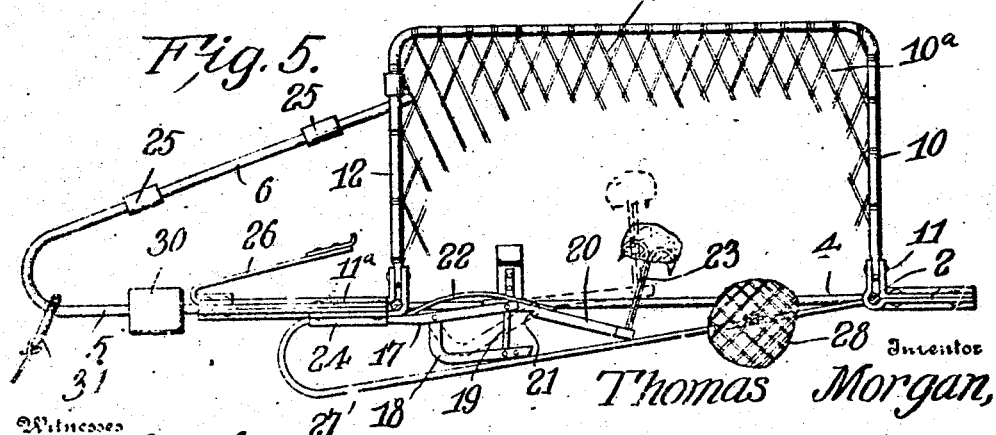
Witnesses
C. E. Smith.
John F. Byrne.
Inventor
Thomas Morgan,
By Victor J. Evans
Attorney

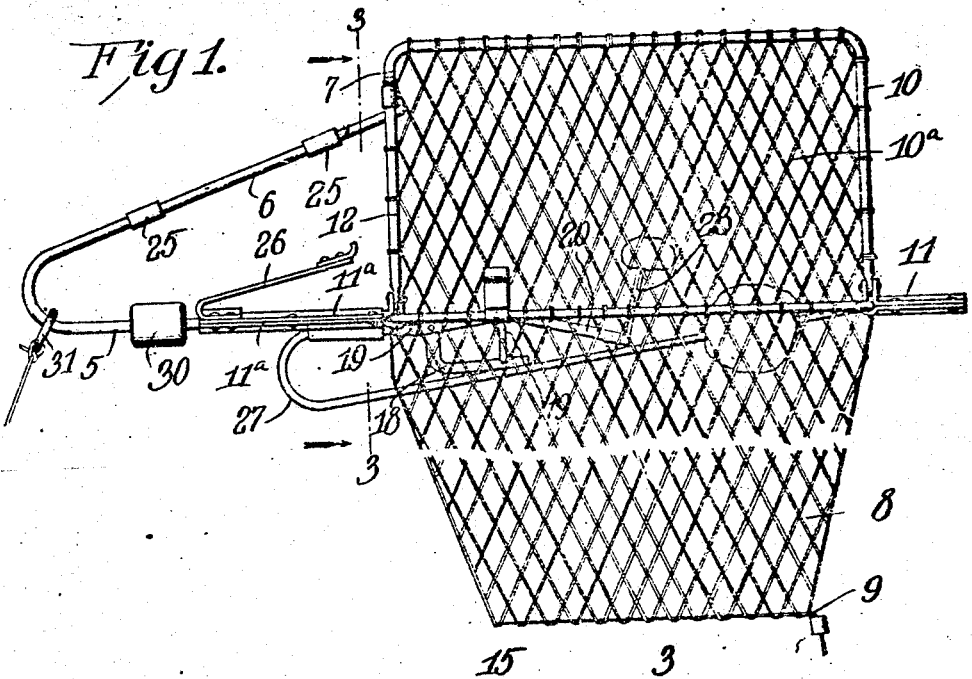
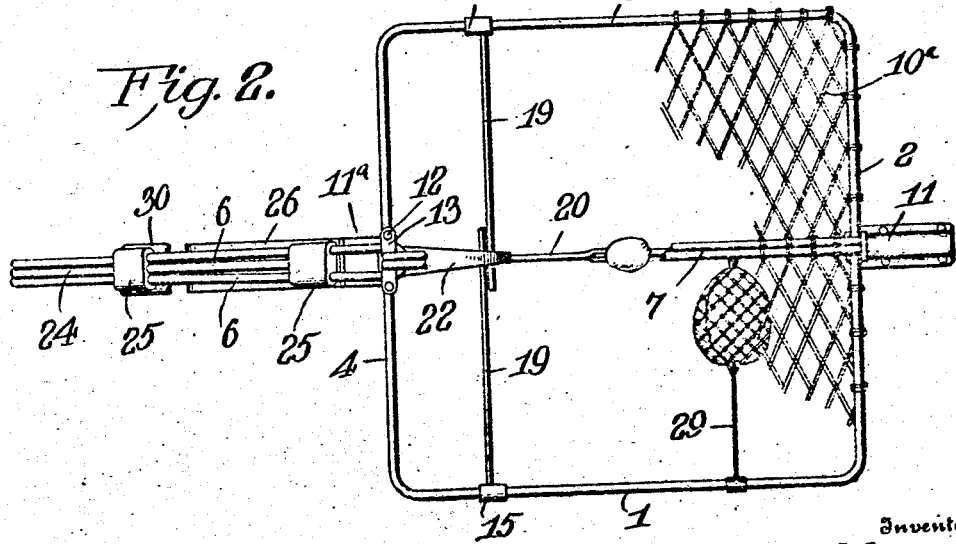

UNITED STATES PATENT OFFICE.

THOMAS MORGAN, OF PENSACOLA, FLORIDA.

FISH-TRAP.

No. 899,457.

Specification of Letters Patent.

Patented Sept. 22, 1908.

Application filed April 21, 1908. Serial No. 428,335.

*To all whom it may concern:*

Be it known that I, THOMAS MORGAN, a citizen of the United States of America, residing at Pensacola, in the county of Escambia and State of Florida, have invented new and useful Improvements in Fish-Traps, of which the following is a specification.

My invention relates to fishing apparatus, and its primary object is the provision of a fish trap which is simple, durable and efficient, and which may be manufactured and sold at a comparatively low cost.

With the above and other objects in view, the invention consists in the construction, combination and arrangement of parts hereinafter fully described, claimed and illustrated in the accompanying drawing, wherein:

Figure 1 is a view in side elevation of a fish trap constructed in accordance with my invention. Fig. 2 is a top plan view thereof, a portion of the netting being omitted and a portion of the cover sections being broken away. Fig. 3 is a sectional view taken on a plane indicated by the line 3—3 of Fig. 1. Fig. 4 is a view similar to Fig. 3, the cover sections being shown in opened position and the netting being omitted. Fig. 5 is a sectional view taken on a plane extending vertically and centrally through the trap, and Fig. 6 is a detail perspective view of the means by which the cover sections of the trap are released.

Referring to the drawings by reference numerals, 1, 2, 3 and 4 designate the sides of a rectangular frame, which is preferably constructed of a single length of material. After the material is formed to provide the frame, it is continued laterally from a point centrally between the ends of the side 4 of the frame to provide a pair of parallel arms 5. After the arms 5 are formed, the material is bent in the direction of the frame to provide a pair of spring members 6 which are adapted to retain the cover of the trap normally closed, and which are adapted to return the cover to its closed position. Netting of suitable mesh and material is secured to the rectangular frame to provide a receptacle 8 for the trapped fish. One end of the receptacle 8 is adapted to be closed by a draw string 9, and the opposite end of the receptacle is closed by the cover which consists of sections 7. Each cover section 7 consists of a substantially U-shaped frame 10 and netting $10^a$ of suitable mesh and material. The frames 10 are secured at their ends to brackets 11 and $11^a$, and the netting $10^a$ is secured to the frames 10 and to the sides of the rectangular frame. The brackets 11 and $11^a$ are secured to and centrally between the ends of the sides 2 and 4 of the frame. After the material has been formed to provide the frames 10 of the cover sections 7, it is continued and formed to provide members 12, each of which is arranged in spaced and parallel relation to one of the end bars of each frame. The members 12 are secured in proper relation to the end bars of the frames 10 by means of clamps 13 which are carried by said end bars, and which engage the members at points adjacent their free ends. The members 12 provide ways 14 for the reception of the free ends of the spring members 6, the ends of the spring members traveling in the ways during the opening and closing of the cover sections 7.

The cover sections 7 are adapted to be retained in opened position by means of catches 15 which are pivotally secured to the sides 1 and 3 of the frame, and which are provided with heads 16 adapted to engage over the side bars of the cover sections, as fully illustrated in Fig. 4 of the drawings. An arm 17 is secured to the bracket $11^a$, and pivotally mounted upon the arm is a trigger 18. The trigger is connected to the catches 15 by means of rods 19. The connection between the trigger and catches is such that when the trigger is in one position the catches are secured in locking position, while when the trigger is in another position the catches are released to permit the cover sections 7 to be closed by the spring members 6. A bait lever 20 is adapted to hold the trigger 18 in position to secure the catches 15 in locking position. The lever 20 is pivotally mounted upon the arm 17 and is provided with a notch 21 in which the free end of the trigger 18 is adapted to engage when the trigger is in position to secure the catches 15 in locking position. A leaf spring 22, which is secured at one end to the bracket $11^a$, engages the bait lever 20 to yieldingly retain the lever in position to hold the trigger. The lever 20 is provided with a pair of fish hooks 23 adapted to carry the bait. When the bait is touched the lever 20 is thrown out of engagement with the trigger 21, thus releasing the catches 15, whereupon the spring members 6 will return the cover sections 7 to their closed position. In order to increase the resiliency of the spring members 6, a spring rod 24 is secured at one end to the bracket 11ᵃ and interposed between the members, the members and rod being secured together by means of clamps 25. A leaf spring 26 is secured to the bracket 11ᵃ and is adapted to be compressed by the spring members 6 when the cover sections 7 are opened, said spring being adapted to impart an initial movement to the members 6, whereby to insure the prompt closing of the cover sections 7 when they are released. A bar 27 is secured at its ends to the brackets 11 and 11ᵃ, and is designed to strengthen the frame of the trap. A bait receptacle 28, which is constructed of any suitable material and mesh, is carried by a flexible element 29, secured at its ends to the bar 27 and the side 1 of the frame of the trap. A member 30 is secured to the arms 5 to hold them in proper relative position, and a ring 31 is mounted upon the arms, said ring providing means by which the trap can be secured to a line.

In practice, the trap is secured to a line, baited, set and deposited in the water. The nibbling of the bait by a fish will release the cover sections of the trap, whereupon they will be moved into their closed position by means of the spring members 6. The fish may be readily and quickly removed from the trap by loosening the draw string 9.

From the foregoing description taken in connection with the accompanying drawings, the construction and mode of operation of the invention should be understood without a further extended description.

Changes in the form, proportions and minor details of construction may be made within the scope of the claims without departing from the spirit or sacrificing any of the advantages of the invention.

Having fully described and illustrated my invention, what I claim is:

1. A fish trap comprising a reticulated receptacle, reticulated cover sections adapted to close the receptacle, means adapted to normally retain the cover sections closed, catches adapted to engage the cover sections to retain them open, a trigger, connection between the trigger and catches, and a bait lever, the bait lever being adapted to secure the trigger in position to hold the catches in locking position.

2. A fish trap comprising a frame, a receptacle secured to the frame, cover sections pivotally mounted upon the frame, means adapted to normally retain the cover sections closed, a spring adapted to be compressed by said means when the cover sections are opened, and retractile means adapted to retain the cover sections opened.

3. A fish trap comprising a frame, a receptacle secured to the frame, brackets secured to the frame, cover sections pivotally mounted upon the brackets, means adapted to normally retain the cover sections closed, an arm secured to one of the brackets, a trigger pivotally mounted upon the arm, catches pivotally mounted upon the frame and adapted to retain the cover sections open, connection between the trigger and the catches, and a lever adapted to hold the trigger in position to secure the catches in locking position.

4. A fish trap comprising a frame, a receptacle secured to the frame, brackets secured to the frame, cover sections pivotally mounted upon the brackets, a bar secured at its ends to the brackets, means adapted to normally retain the cover sections closed, a spring secured to one of the brackets, said spring being adapted to be compressed by said means when the cover sections are opened, a bait receptacle secured to the frame, and retractile means adapted to retain the cover sections opened.

5. A fish trap comprising a frame, netting secured to the frame to provide a receptacle, a draw string adapted to close one end of the receptacle, frames pivotally mounted upon the first named frame, netting secured to said frames to provide cover sections adapted to close the other end of the receptacle, means adapted to normally retain the cover sections closed, and retractile means adapted to secure the cover sections opened.

6. A fish trap comprising a frame, a receptacle secured to the frame, cover sections pivotally mounted upon the frame, said jaws being provided with integral members bent to form ways, spring members secured to the frame and having their free ends disposed for movement in the ways, and retractile means adapted to retain the cover sections opened.

7. A fish trap comprising a receptacle, cover sections for the receptacle, catches adapted to retain the cover sections opened, a trigger, connection between the trigger and the catches, and a bait lever adapted to secure the trigger in position to hold the catches in locking position.

8. A fish trap comprising a frame, a receptacle secured to the frame, cover sections pivotally mounted upon the frame, catches pivotally mounted upon the frame for engagement with the cover sections to retain them opened, a trigger, connection between the trigger and the catches, and a bait lever, the bait lever being adapted to secure the trigger in position to hold the catches in locking position.

In testimony whereof I affix my signature in presence of two witnesses.

THOMAS MORGAN.

Witnesses:
H. MULLER,
R. H. PFEIFFER.